O. B. BRADY.
SEAT STRUCTURE FOR AUTOMOBILES.
APPLICATION FILED JUNE 23, 1915.
1,188,241.
Patented June 20, 1916.
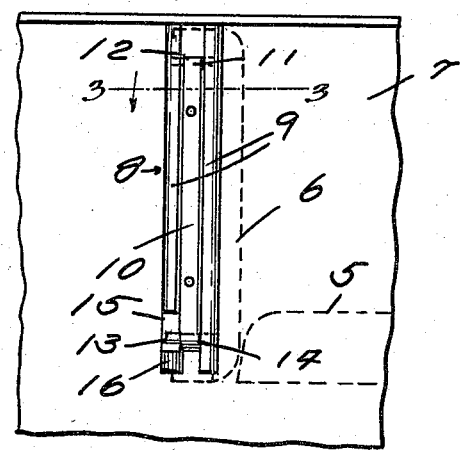
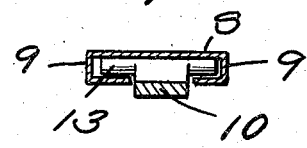
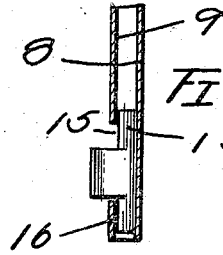
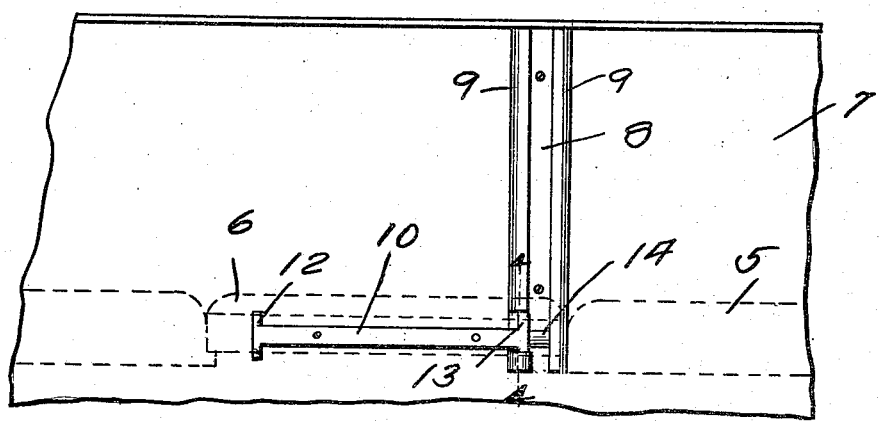
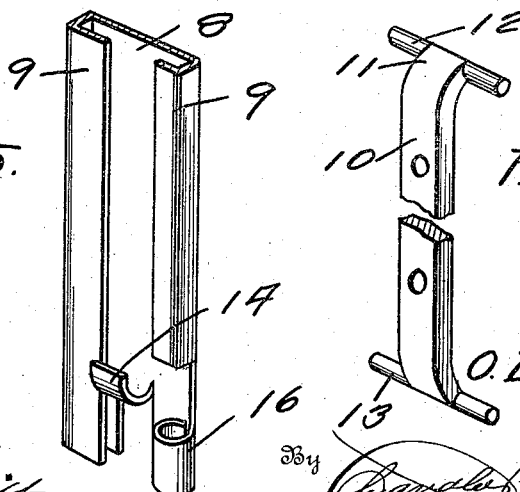
Inventor
O. B. Brady

UNITED STATES PATENT OFFICE.

OWEN B. BRADY, OF MANCOS, COLORADO.

SEAT STRUCTURE FOR AUTOMOBILES.

1,188,241.  Specification of Letters Patent.  Patented June 20, 1916.

Application filed June 23, 1915. Serial No. 35,390.

*To all whom it may concern:*

Be it known that I, OWEN B. BRADY, a citizen of the United States, residing at Mancos, in the county of Montezuma, State of Colorado, have invented certain new and useful Improvements in Seat Structures for Automobiles; and I do hereby declare the following to be a full, clear, and exact description of the invention, such as will enable others skilled in the art to which it appertains to make and use the same.

This invention relates to new and useful improvements in seat structures for automobiles or other vehicles, or in any other connection where there is provided a series of seats having back portions and has for its primary object the provision of means whereby said back portions may be mounted with relation to the seats so that they may extend vertically to perform their normal function or be shifted to lie substantially in the plane of the seat structure and adjacent thereto in such relation as to form a surface which may be used as a bed.

It is further the object to provide such a mounting for the backs whereby they may be readily manipulated to assume either position desired, and which efficiently holds the back in such desired positions, it being more specifically an object to provide such a mounting which is exceedingly compact in nature so that it may be readily associated with automobile structures to position the back of the front seat between the front and rear seats to form therewith a surface which may serve as a comfortable bed.

With the above and other objects and advantages in view, the invention resides more particularly in the novel combination, formation and arrangement of parts as more fully described hereinafter and pointed out in the appended claim.

Reference is had to the accompanying drawing, wherein similar characters of reference designate corresponding parts throughout the several views, and in which:

Figure 1 is a side elevation of the improved back mounting, and showing a seat portion and a seat back associated therewith in dotted lines to indicate the relative position which the device assumes. Fig. 2 is a similar view, but showing the relation of the parts when the back is adjusted to a horizontal position to form a bed. Fig. 3 is a transverse sectional view on the line 3—3 of Fig. 1. Fig. 4 is a sectional view on line 4—4 of Fig. 2. Fig. 5 is a perspective view of the member of the device carried by the automobile body or other support. Fig. 6 is a perspective view of the member carried by the seat back.

Referring now more particularly to the accompanying drawings, in Figs. 1 and 2, 5 designates the outline of a seat and 6 the back portion thereof, the seats being shown as in section and of the general arrangement as in an automobile body designated at 7. Secured to the body and extending vertically from each end of the rear edge of the seat 5 is a plate 8 having its side edges bent inwardly at 9 to provide opposed channels opened at their upper end. Carried by the adjacent edge of the back 6 is a bar 10 having its end portions directed away from the back at 11 and provided with laterally extending upper and lower pintles 12 and 13, respectively, adapted to engage in the channels 9 to hold the back in a vertical position. Sliding movement of the bar downwardly with respect to the plate is limited by turning the lower end of the plate inwardly at 14 to thus hold the back in proper vertical position.

For holding the back in a horizontal position the lower end of that bent side portion 9 farthest from the seat is cut away as at 15 and below this cut away portion it is curved inwardly to provide a sleeve or socket 16 adapted to seat one of the pintles 13.

In operation, assuming that the seat back is held in a vertical position by engagement of its pintles in the channel, to actuate the back to a horizontal position it is first lifted until the pintles 12 are raised out of the top of the channels. This permits the back to be then swung rearwardly and simultaneously lowered and one of the pintles 13 is seated in the socket 16, with the other pintle bearing against the wall of the channel inwardly of the cut away portion 15. It is thus efficiently held, although an additional holding means may comprise a suitable bracket or stop carried by the car body, this being not necessarily shown.

From the foregoing description it is seen that an exceedingly simple device has been provided wherein a seat back may be so mounted as to serve both in its normal function and to form with the seat portions of the vehicle a comfortable bed. As the device is exceedingly compact, it may be readily associated with automobile structures without marring the design thereof or constituting any other disadvantages.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:—

A fastener means of the class described comprising a plate having its side edges bent inwardly to form open channels and one end bent inwardly to form a stop, a second member having its ends laterally bent, pintles extending from said ends and adapted to slidably engage in the channels, one of the channels being cut away adjacent the laterally turned end of the device, and a socket portion formed outwardly of said cutaway portion adjacent the channel to seat one of the pintles.

In testimony whereof, I affix my signature, in the presence of two witnesses.

OWEN B. BRADY.

Witnesses:
GEO. M. CARR,
EDW. E. HUMISTON.

Copies of this patent may be obtained for five cents each, by addressing the "Commissioner of Patents Washington, D. C."